United States Patent [19]

Pillon et al.

[11] Patent Number: 4,883,363

[45] Date of Patent: Nov. 28, 1989

[54] DEVICE INTER ALIA FOR UNIFORMLY DISTRIBUTING SOLID AND/OR LIQUID PARTICLES, AND AN ASSEMBLY COMPRISING SUCH A DEVICE

[76] Inventors: Francis D. Pillon, 33 rue d'Amiens; Michel A. Andriot-Ballet, 9 avenue de Bourgogne, both of 60000 Beauvais, France

[21] Appl. No.: 241,664

[22] Filed: Sep. 8, 1988

[30] Foreign Application Priority Data

Sep. 8, 1987 [FR] France ................................ 87 12441

[51] Int. Cl.[4] ......................... B01F 7/16; B01F 15/02; B02C 13/22; B65G 65/32

[52] U.S. Cl. ................................ 366/157; 241/188 A; 366/246; 366/263; 366/296; 414/302; 414/327

[58] Field of Search ............... 366/154, 155, 156, 157, 366/186, 244, 245, 246, 247, 249, 250, 251, 252, 253, 263, 264, 265, 303, 304, 317, 293, 294, 296, 295; 222/251, 252, 372, 410, 412, 413, 415; 414/288, 300, 301, 302, 325, 327; 241/68, 79, 97, 100, 186 A, 186.2, 186.4, 187, 191, 244, 245, 248, 251, 253, 188 R, 188 A; 198/640, 642; 239/650, 651, 654, 655, 658, 662, 667, 681, 682, 683, 684, 687, 689, 302, 325, 685; 141/129, 131, 392, 250, 283, 69, 311 R, 363

[56] References Cited

U.S. PATENT DOCUMENTS

| | | | |
|---|---|---|---|
| 211,576 | 1/1879 | Lawton et al. | 366/317 X |
| 412,321 | 10/1889 | Burkman | 241/108 A |
| 894,753 | 7/1908 | Smith | 366/296 X |
| 2,324,018 | 7/1943 | Petersen | 241/188 A |
| 2,619,330 | 11/1952 | Willems | 366/303 X |
| 2,639,901 | 5/1953 | Teale | 366/317 X |
| 2,717,703 | 9/1955 | Kull et al. | 414/327 X |
| 4,107,792 | 8/1978 | Durr | 366/304 X |
| 4,342,345 | 8/1982 | Nadin et al. | 141/392 |
| 4,384,787 | 5/1983 | Ito et al. | 366/155 X |

*Primary Examiner*—Harvey C. Hornsby
*Assistant Examiner*—Scott J. Haugland
*Attorney, Agent, or Firm*—Armstrong, Nikaido, Marmelstein, Kubovcik & Murray

[57] ABSTRACT

A device inter alia for uniformly distributing solid and/or liquid particles. It comprises, on the one hand, a hollow vertical primary shaft (1) driven in rotation, the bottom end of the shaft comprising a primary ring (4), the bottom surface of which bears vertical teeth (5) disposed in concentric circles, the device also comprising a hollow vertical secondary shaft (2) driven in rotation in the opposite direction to the primary shaft (1) and at its bottom end comprising a cylindrical cage (10) comprising a secondary ring (11) and a disc (12) connected to the bottom surface of the secondary ring (11) by at least three bars (13), the top surface of the disc (12) comprising vertical teeth (14) disposed concentrically and staggered with respect to the teeth (5) in the primary ring (4), and at its center the disc comprises a circular anvil (15) coaxial therewith and at least equal in diameter to the primary shaft (1).

The device can be used for homogenizing, crushing, grinding, pulverizing and/or spreading solid and/or liquid products.

11 Claims, 5 Drawing Sheets

DEVICE INTER ALIA FOR UNIFORMLY DISTRIBUTING SOLID AND/OR LIQUID PARTICLES, AND AN ASSEMBLY COMPRISING SUCH A DEVICE

The invention relates to a device inter alia for uniformly distributing solid and/or liquid particles in order to deposit regular, accurate, uniform layers of powdery products or for making mixtures of powdery products, liquid products or powdery products in liquid products. The invention also relates to an assembly comprising such a device.

Document FR-A-1 311 922 discloses a device for bringing fluid substances and/or solid substances into contact and comprising a rotating plate, two streams of liquid and/or solid substances being accelerated on the various surfaces of the plate and delivered by centrifugal force to the plate periphery so as to enter into contact with one another. Preferably the opposite surfaces of a single plate are used. In one embodiment, one stream is of a solid substance in powder form which is brought by descending motion on to the upper surface of a plate comprising horizontal centrifugal blades, whereas the other stream is of a gas and is directed towards the bottom surface of the plate, the diameter of which is much larger than the diameter of the ducts supplying each stream. The stream of gas rises above the periphery of the plate and entrains the powder leaving the top surface of the plate at the periphery, towards a fluidizing section disposed at the top of the device. This device can only bring a fluid substance in continuous contact with a solid substance.

There is also a known device described in document FR-A-950 579 for spraying and atomising liquid or pasty products. The device comprises two rotary assemblies rotating in opposite directions each comprising one or more conical plates on which the substance to be sprayed flows and spreads. This device cannot be used for making mixtures, but only for reducing the size of particles.

There are also known conventional spreaders for powdery products and for covering a given area. These require a narrow belt to be moved in translation, the main disadvantage of which is irregular distribution and thickness of the layer, and that it is impossible to distribute a small quantity of powdery products over a large area.

Conventional mixers require an operating time which is directly in proportion to the desired degree of homogenization. The resulting energy and maintenance costs are considerable.

One aim of the invention therefore is to supply a device inter alia for uniformly distributing solid and/or liquid particles and also of use for making homogeneous mixtures and/or reducing the size of particles.

Another object of the invention is to provide an aforementioned device which saves energy and is easy to maintain.

These objects together with others which will appear hereinafter, are obtained by a device inter alia for uniformly distributing solid and/or liquid particles, characterised, according to the invention, in that it comprises, on the one hand, a hollow vertical primary shaft driven in rotation, the bottom and comprising a substantially horizontal primary ring the bottom surface of which bears vertical teeth disposed in concentric circles, the device on the other hand comprising a hollow vertical secondary shaft in which the primary shaft is coaxially disposed and which is driven in rotation in the opposite direction to the rotation of the primary shaft, the bottom end of the secondary shaft comprising a cylindrical cage containing a secondary ring secured to the aforementioned bottom end and wider than the primary ring and a disc connected to the bottom surface of the secondary ring by at least three solid bars, the top surface of the disc, which faces the bottom surface of the secondary ring, comprising on the one hand vertical teeth disposed concentrically and staggered with respect to the teeth on the first ring disclosed inside the cylindrical cage, and on the other hand comprising a central circular anvil coaxial therewith and at least equal in diameter to the primary shaft.

In a preferred embodiment of the invention, the device also comprises a removable tube disposed coaxially inside the primary shaft and secured thereto in rotation, and the circular anvil has a diameter at least equal to that of the removable tube.

Advantageously, the removable tube comprises a screw along its entire length and driven in rotation.

In a variant, the removable tube is disposed inside the primary shaft and secured thereto in rotation and its bottom end describes a ring above the circular anvil, the diameter of which is at least equal to the outer diameter of the thus-described ring.

Optionally the device is mounted on and extends through a horizontal plate, a cylindrical-conical skirt being secured to the bottom surface of the plate and flaring towards the cylindrical cage, the bottom of the cage being substantially lower than the disc of the cage.

In a variant embodiment, the cylindrical part of the skirt has a zone of wide openings, and the secondary shaft, in a zone situated under the wide-aperture zone, comprise a screw having at least two blades rotating in the space bounded by the secondary shaft and the cylindrical part of the skirt.

Advantageously, a means for stopping particles is disposed on the bottom surface of the horizontal plate; it comprises a set of square frames coaxial with the secondary shaft and each bearing hanging screens having an area proportional to the distribution of solid particles on the ground.

In a preferred embodiment, the screens are disposed symmetrically with respect to the diagonals of the frame assembly and the lines through the centres of each side of the frames.

If the assembly is made up of five frames numbered 1 to 5 from the centre, the width of the half-screen situated in the corner of the fifth frame being defined by a centre angle of $\pi/72$, the width of the screen situatined on the fourth frame being defined a centre angle of $\pi/45$, the width of the screen situated on the third frame being defined by a centre angle of $\pi/60$, the width of the screen situated on the second frame being defined by a centre angle of $\pi/90$, the width of the screen situated on the first frame being defined by an angle of $\pi/180$ and the width of the half-screen situated on the fifth frame being defined by a centre angle of $\pi/71$, all the central angles being adjacent, and the resulting pattern being repeated twice without discontinuity.

In one particular embodiment, the disc in the cylindrical cage has a central opening and the circular anvil is disposed on fins which together determine passages for a flow of product sucked through the central aperture.

As previously stated, the invention also relates to an assembly comprising a frusto-pyramidal chamber, the top surface of which comprises the horizontal plate fitted with the device described hereinbefore, comprising a cylindrical-conical skirt and a screw, the bottom of the plate being open above a means for collecting the completed product.

The following description, which is in no way limitative, should be read with reference to the accompanying drawings in which.

Figure 1:
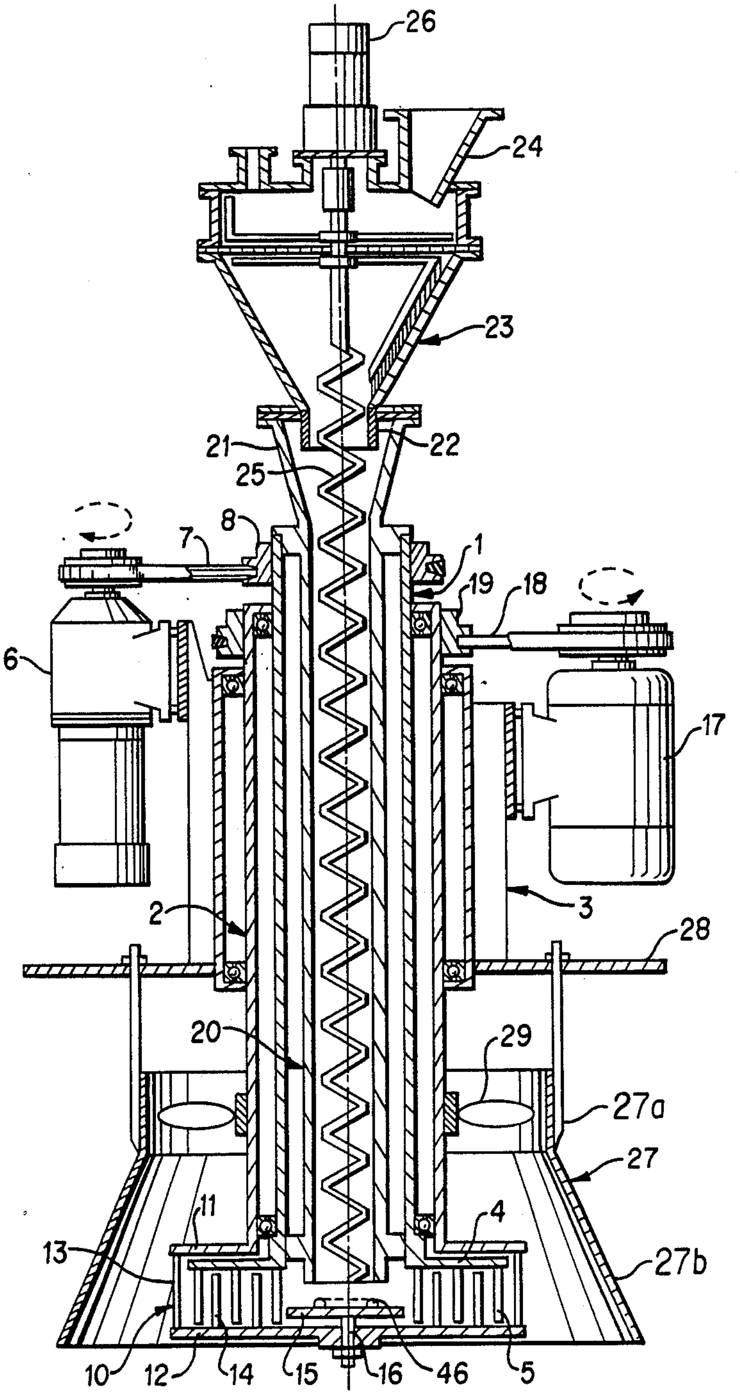
FIG. 1 is a longitudinal section through an assembly comprising a device according to the invention.
Figure 3:
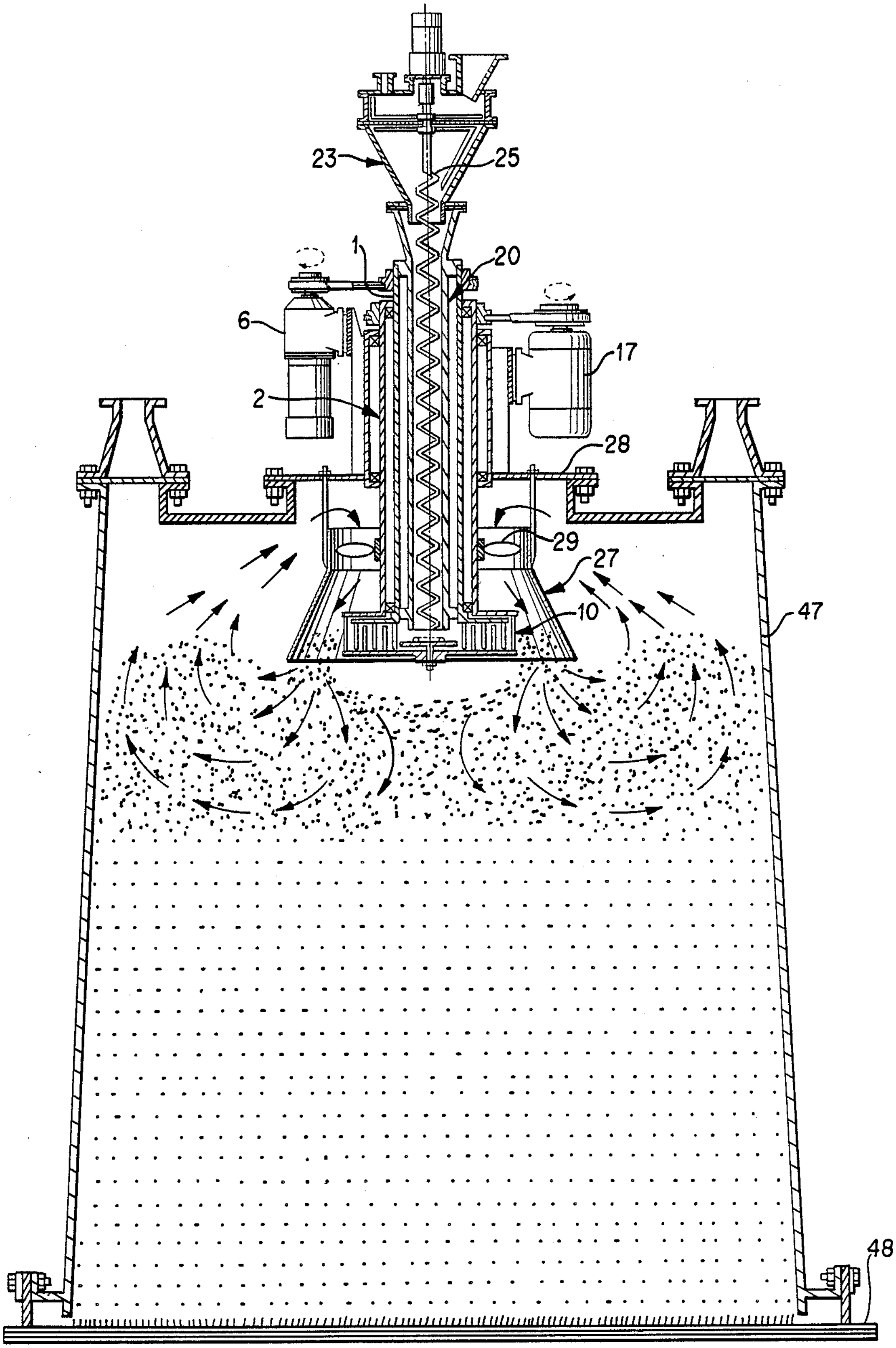
Figure 4:
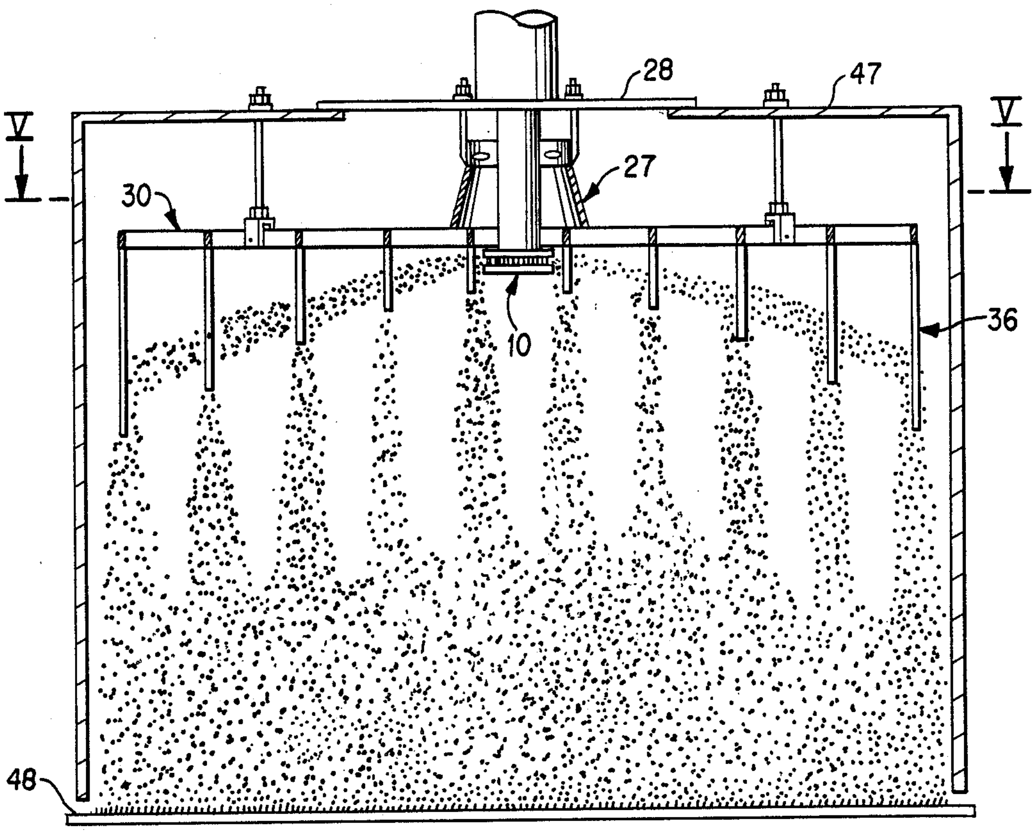
Figure 5:
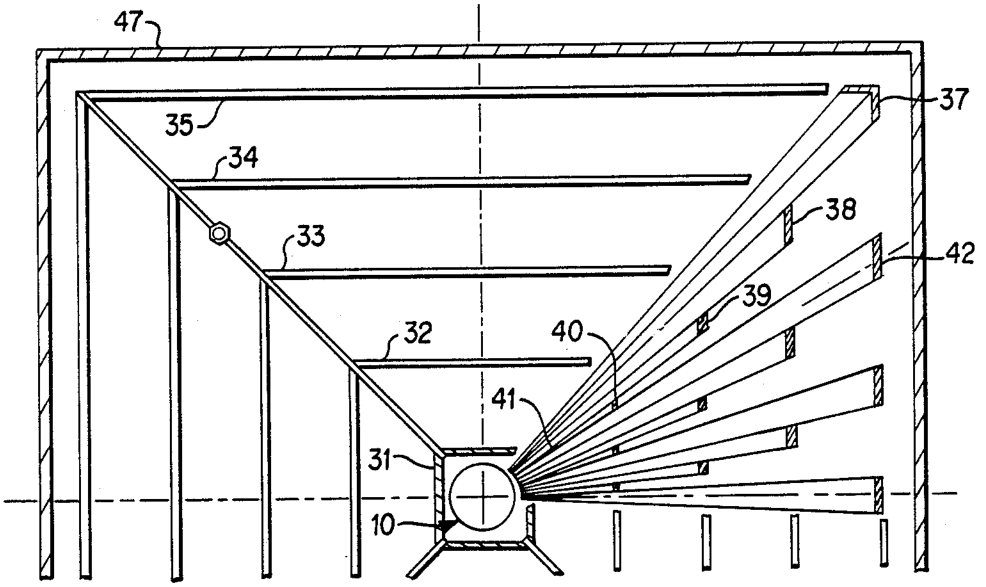

FIG. 3 corresponds to FIG. 1 and shows the entire assembly when the device is used to spray and spread powdery or liquid products;

FIG. 4 is a diagrammatic view in longitudinal section of the bottom part of the device according to another embodiment;

FIG. 5 is a half-view in section along line V—V of FIG. 4, and

Figure 6:
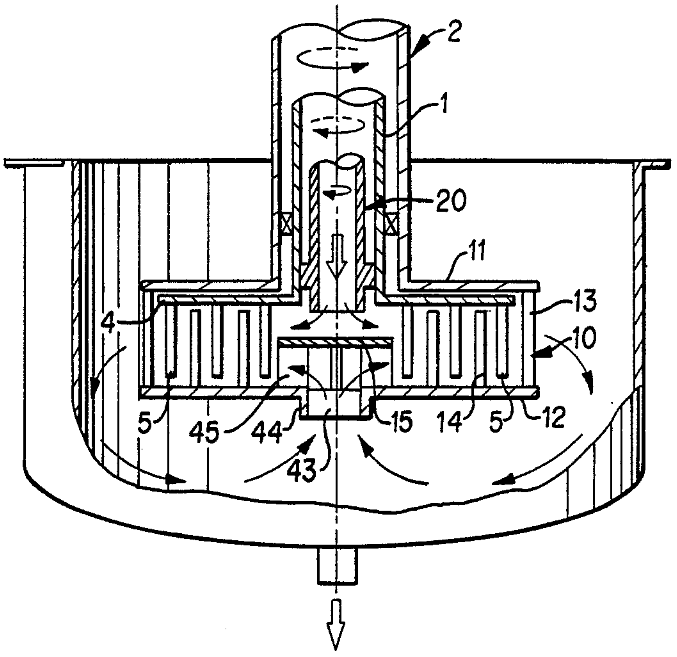

FIG. 6 is a view in longitudinal section of a variant embodiment of the bottom part of the device.

According to the invention, the device comprises a vertical hollow primary shaft 1, and a vertical hollow secondary shaft 2 in which the primary shaft 1 is coaxially disposed. The two shafts are held in position in known manner in a frame 3 which will not be described hereinafter.

At its bottom end, the primary shaft 1 has a substantially horizontal primary ring 4, the bottom surface of which bears vertical teeth 5. The teeth are disposed in concentric circles. The primary shaft 1 is driven in rotation by a first motor 6 and belt 7 cooperating with a pully 8 secured to the top end of the primary shaft 1.

At its bottom, the secondary shaft 2 has a cylindrical cage 10 enclosing the primary shaft 4. Cage 10 comprises a secondary ring 11 secured to the bottom end of the secondary shaft 2, and wider than the primary ring 4, and also comprises a disc 12 connected to the bottom surface of ring 11 by four bars 13 in the present embodiment. The top surface of disc 12, i.e. opposite the bottom surface of the secondary ring 11, has vertical teeth 14 disposed concentrically and staggered with respect to the teeth 5 of the first ring 4. When shafts 1 and 2 rotate in opposite directions, the teeth in one ring describe circles disposed between those described by the teeth in the other ring. At its centre, disc 12 has a circular anvil 15 coaxial therewith. Anvil 15 is situated at the top of a rod 16.

The secondary shaft 2 is driven in rotation but in the opposite direction to the primary shaft 1, by a second rotor 17 and belt 18 cooperating with a pulley 19 disposed at the end of shaft 2. The top end is disposed below the pulley 8 borne by the primary shaft 1. For reasons inter alia of space, the two rotors 6 and 17 can be combined into one, provided that the single motor has two output shafts rotating at different speeds so as to drive shaft 1 separately from shaft 2.

In the present embodiment, the device also comprises a removable tube 20 disposed coaxially inside the primary shaft 1 and secured thereto in rotation. The bottom end of tube 20 opens above the circular anvil 15, the diameter of which is slightly greater than the diameter of tube 20.

At its top, tube 20 comprises a funnel 21 disposed under the bottom opening 22 of a frusto-conical hopper 23 containing the product or products to be processed. The products are inserted into hopper 23 via one or more supply troughs 24. When opening 22 is open, the powdery products fall into tube 20, which rotates together with shafts 1 and 2. The rotation produces suction which promotes the fall of products. Funnel 21 and/or funnel 23 comprise an air inlet.

Owing to the rotation of tube 20, the products tends to collect in the inner all and consequently to fall on to anvil 15, so as to substantially form a ring 46.

Admittedly, tube 20 is not essential, since the same result could be obtained by using the primary shaft 1 as a tube. Owing to the fact, however, that it is removable, tube 20 is more flexible in use, as will easily be understood by the person skilled in the art.

Once the products are on the circular anvil 15, they are expelled by centrifugal force from the cylindrical cage 10 and, if required, are broken up by the rotating teeth 5 and 14. The expulsion is consequently slowed down by the set of teeth, which bring about artificial deceleration. The deceleration and fragmentation or repeated shearing of the product by the vertical teeth 5 and 14 additionally improve the distribution of the product at the periphery of cage 10.

In the case of some products, it may be necessary to dispose a cylindrical screw inside tube 20, the screw being driven in rotation by a third motor 26 disposed on hopper 23 in the present embodiment. In that case, screw 25 also extends through the frusto-conical hopper 23.

Figure 2:
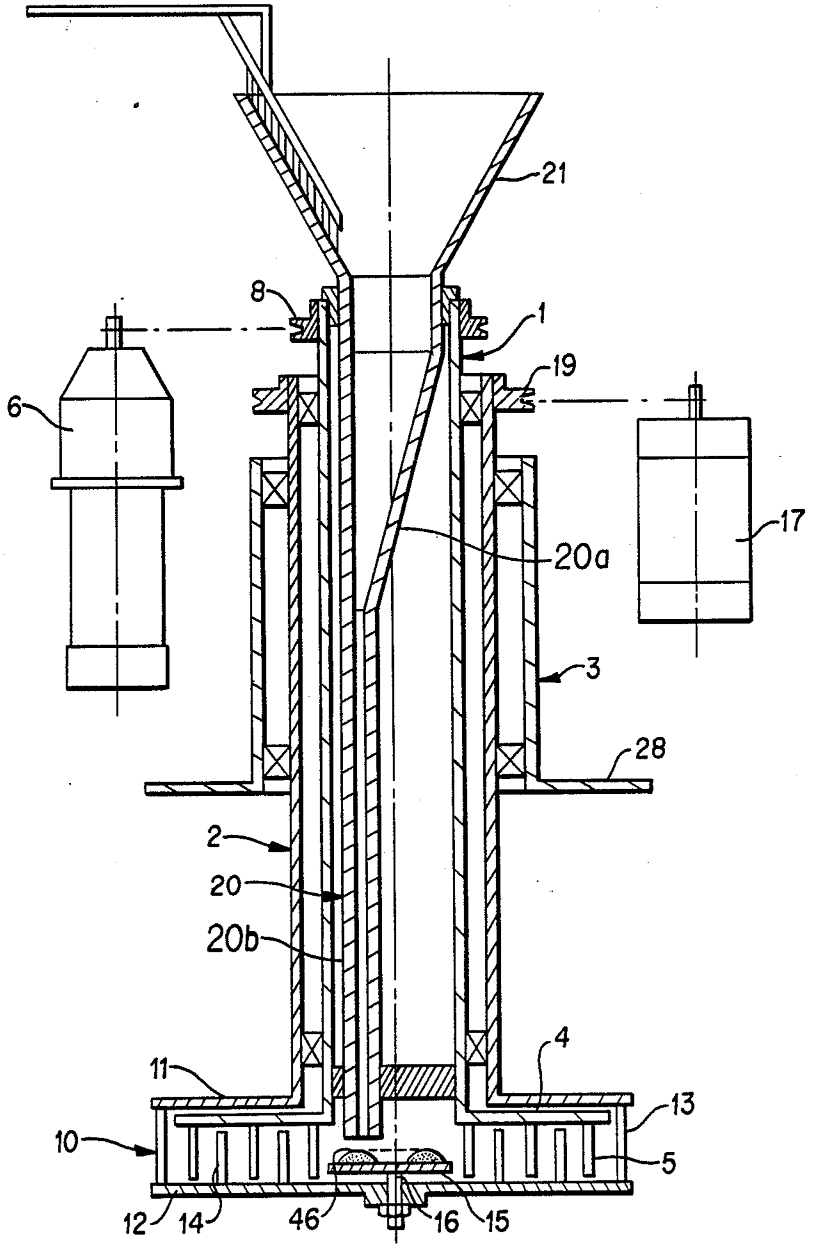
FIG. 2 is a longitudinal section through an assembly comprising a variant of the device.

Alternatively, as shown in FIG. 2, a funnel 21 can be used directly. FIG. 2 also relates to a variant embodiment comprising the removable tube 20. The tube comprises a coaxial top part 23*a* and a vertical bottom part 23*e* having its axis parallel to the axis of the primary shaft 1. During rotation therefore, the bottom part 23*e* describes a cylinder, so that the product falls in a ring 46 on to the circular anvil 15.

In the case of certain products and/or certain applications, it may be necessary to surround the bottom part of the device by a cylindrical conical skirt 27 secured to a horizontal plate 28 through which the device extends. Plate 28 can be the top wall of a chamber 47, the bottom part of which opens above a device 48 for collecting the processed product. Skirt 27 flares towards the cylindrical cage 10 and its bottom edge is situated in a plane slightly below the plane of disc 12.

In order to improve the mixing and spreading of products, the device comprises a screw 29 having blades secured to shaft 2 and to the exterior. In that case, the cylindrical part 27*a* of the skirt has wide apertures in the zone situated above screw 29, so as to enable gas to flow as shown in FIG. 3.

The frusto-pyramidal chamber 46 has a square cross-section which can in fact constitute an expansion chamber. The flow of air produced by screw 29, represented by arrows in FIG. 3, brings about excellent dispersion, in a horizontal plane, of the product from the cylindrical cage 10. The result is an excellent, homogeneous distribution, e.g. a mist, of the products in chamber 47. The mist settles by gravity on a means 48 for collecting the products after treatment. The means 48, on which a determined quantity of products are efficiently spread, is usually a conveyor belt.

In another embodiment shown in FIGS. 4 and 5, an assembly 30 comprising metal frame is disposed in a plane slightly higher than the plane of the secondary ring 11. In the present embodiment, the assembly comprises five frames 31 to 35 from which screens 36 are suspended, the length of the screens increasing from the inner or first screen 31 to the outer or fifth screen 35. The screens can be used for stopping particles expelled from the cylindrical cage 10 and have an area proportional to the area of distribution on the ground, the area being embodied by the means 48 for connecting the product after treatment.

The five frames 31 to 35 are square and their axis of symmetry is the axis of rotation of the device. They are suspended from the horizontal plate 28 by known means, the plate forming part of the previously-described chamber 47. The screens are symmetrically disposed with respect to the diagonals and the bisectors of each side of the frame. On each half-side, the pattern hereinafter is repeated twice continuously, i.e. each half-side comprises three patterns.

The width of the first half-screen 37 at the corner of the fifth frame 35 is defined by a centre angle of $\pi/72$; the width of the screen 38 on the fourth frame 34 is defined by a central angle of $\pi/45$; the width of the screen 39 situated on the third frame 33 is defined by a centre angle of $\pi/60$; the width of the screen 40 situated on the second frame 22 is defined by a centre angle $\pi/90$; the width of the screen 41 on the first frame 31 is defined by a centre angle of $\pi/180$, and the width of the second half-screen 42 on the fifth frame 35 is defined by a centre angle $\pi/72$.

FIG. 6 shows a cylindrical cage 10 adapted more particularly for mixing liquids or liquids and solids. In that case, disc 12 comprises a centre aperture 43 externally bounded by a cylindrical wall 44. The circular anvil 15 is mounted on fins 45 which together bound passages for a flow of fluid sucked through opening 43.

As can be seen, the device according to the invention can be used for mixing, homogenizing, grinding, crushing, atomizing and/or spreading solid and/or liquid products. It can therefre be used in a large number of sectors of industry.

We claim:

1. A device inter alia for uniformly distributing solid and/or liquid particles, characterised in that it comprises, on the one hand, a hollow vertical primary shaft (1) driven in rotation, the bottom end comprising a substantially horizontal primary ring (4) the bottom surface of which bears vertical teeth (5) disposed in concentric circles, the device on the other hand comprising a hollow vertical secondary shaft (2) in which the primary shaft (1) is coaxially disposed and which is driven in rotation in the opposite direction to the rotation of the primary shaft (1), the bottom end of the secondary shaft comprising a cylindrical cage (10) containing a secondary ring (11) secured to the aforementioned bottom end and wider than the primary ring (4) and a disc (12) connected to the bottom surface of the secondary ring (11) by at least three bars (13), the top surface of the disc (12), which faces the bottom surface of the secondary ring (11), comprising on the one hand vertical teeth (14) disposed concentrically and staggered with respect to the teeth (5) on the first ring (4) disposed inside the cylindrical cage (10), and on the other hand comprising a central circular anvil (15) coaxial therewith and at least equal in diameter to the primary shaft (1).

2. A device according to claim 1, characterised in that it also comprises a removable tube (20) disposed coaxially inside the primary shaft (1) and secured thereto in rotation, and the circular anvil (15) has a diameter at least equal to that of the removable tube (20).

3. A device according to claim 2, characterised in that the removable tube (20) comprises a screw (25) along its entire length and driven in rotation.

4. A device according to claim 1, characterised in that it comprises a removable tube (20) disposed inside the primary shaft (1) and secured thereto in rotation and the bottom end of the removable tube describes a ring above the circular anvil, the diameter of which is at least equal to the outer diameter of the thus-described ring.

5. A device according to claim 1, comprising a horizontal plate, the shafts being mounted on and extending through the horizontal plate (28), a cylindrical-conical skirt (27) being secured to the bottom surface of the plate and flaring towards the cylindrical cage (10).

6. A device according to claim 5, characterised in that the cylindrical part (**27*a*) of the skirt (27) has a zone of wide openings, and the secondary shaft (2), in a zone situated under the wide-aperture zone, comprises a screw (29) having at least two blades rotating in the space founded by the secondary shaft (2) and the cylindrical part (27*a*) of the skirt (27**).

7. A device of claim 6 wherein the device is capable of uniformly pulverizing solid and/or liquid products, the device comprising a frusto-pyramidal chamber having an open bottom surface, the horizontal plate being mounted at the top of the chamber, and means for collecting the solid and/or liquid products below the chamber.

8. A device according to claim 1, comprising a horizontal plate, the shafts being mounted on and extending through the horizontal plate (28), a means for stopping particles disposed on the bottom surface of the horizontal plate (28) and a set of square frames (31 to 35) coaxial with the secondary shaft (2), each frame bearing hanging screens, the area of which is proportional to the distribution of solid particles on the ground.

9. A device according to claim 8, characterised in that the screens are disposed symmetrically with respect to the diagonals of the frame assembly and the lines through the centres of each side of the frames.

10. A device according to claim 9, characterised in that the frame assembly comprises five square frames (31 to 35) and the hanging screens comprise:

- a first half-screen (37) situated at a corner of the fifth frame and having a width defined by a center angle of $\pi/72$, a screen situated on the fourth frame (34) and having a width defined by a center angle of of $\pi/45$, a screen situated on the third frame and having a width defined by a center angle of $\pi/60$, a screen (40) situated on the second frame (32) and having a width defined by a center angle of $\pi/90$, a screen situated on the first frame (31) and having a width defined by a center angle of $\pi/180$, and a second half-screen situated on the fifth frame (35) and having a width defined by a center angle of $\pi/72$, all of the center angles being adjacent and the resulting pattern of screens being repeated twice without discontinuity.

11. A device according to claim 1, characterised in that the disc 12 in the cylindrical cage (10) has a central opening (43) and the circular anvil (15) is disposed on fins (45) which together determine passages for a flow of product suckeed through the central aperature (43).

* * * * *